United States Patent [19]

Masuyama et al.

[11] Patent Number: 4,545,929
[45] Date of Patent: Oct. 8, 1985

[54] CERAMIC MATERIALS WITH A VOLTAGE-DEPENDENT NONLINEAR RESISTANCE

[75] Inventors: Masaru Masuyama, Harunamachi; Susumu Hirooka, Takasaki; Nobutatsu Yamaoka, Harunamachi, all of Japan

[73] Assignee: Taiyo Yuden Co., Ltd., Tokyo, Japan

[21] Appl. No.: 398,193

[22] Filed: Jul. 14, 1982

[30] Foreign Application Priority Data

Jul. 22, 1981 [JP] Japan .................. 56-114877
Feb. 8, 1982 [JP] Japan .................. 57-18496

[51] Int. Cl.$^4$ ............................. H01B 1/06
[52] U.S. Cl. .................. 252/520; 252/521; 501/136
[58] Field of Search .......... 252/518, 520, 521, 62.3 R, 252/62.3 V, 62.3 BT; 501/134, 135, 136, 150, 138, 139; 338/20, 21

[56] References Cited

U.S. PATENT DOCUMENTS

| | | | |
|---|---|---|---|
| 4,101,454 | 7/1978 | Kuwicki et al. | 252/520 |
| 4,160,748 | 7/1979 | Yodogawa et al. | 252/521 |
| 4,338,223 | 7/1982 | Yokomizo et al. | 252/520 |
| 4,362,637 | 12/1982 | Matsuo et al. | 252/521 |
| 4,384,989 | 5/1983 | Kamigaito et al. | 252/520 |

FOREIGN PATENT DOCUMENTS 44981 7/1981 European Pat. Off. .

OTHER PUBLICATIONS

Chemical Abstracts, vol. 88, No. 8, 20th Feb. 1978, p. 454, No. 57530u, Columbus, OH (USA), & JP-A-77 98 995, (TDK Electronics Co., Ltd.), (19-08-1977), *Abstract*.
Chemical Abstracts, vol. 95, No. 10, 7th Sep. 1981, p. 608, No. 89957z, Columbus, OH (USA), & JP-A-81 36 103, (Taiyo Yuden Co., Ltd.), (09-04-1981), *Abstract*.
Chemical Abstracts, vol. 97, No. 2, 12th Jul. 1982, p. 655, No. 15655u, Columbus, OH, (USA), & JP-A-82 27 001, (TDK Electronics Co., Ltd.), (13-02-1982), *Abstract*.

*Primary Examiner*—Josephine L. Barr
*Attorney, Agent, or Firm*—Woodcock Washburn Kurtz Mackiewicz & Norris

[57] ABSTRACT

Ceramic materials suitable for use in varistors, consisting essentially of a major proportion of $SrTiO_3$, the balance being (1) at least one of $Nb_2O_5$, $Ta_2O_5$, $WO_3$, $La_2O_3$, $CeO_2$, $Nd_2O_3$, $Y_2O_3$, $Sm_2O_3$, $Pr_6O_{11}$, $Eu_2O_3$, and $Dy_2O_3$, for making the materials semiconductive, and (2) $Na_2O$, for making surge-proof the varistors made from the ceramic materials. As desired, the compositions may further include one or more of $Ag_2O$, $CuO$, $MnO_2$, and $SiO_2$ for a higher nonlinearity coefficient. Containing $Na_2O$ in proportions ranging from approximately 0.02 to 2.50 mole parts, the ceramic compositions make possible the provision of varistors suffering little from current or voltage surges in use.

2 Claims, 3 Drawing Figures

CERAMIC MATERIALS WITH A VOLTAGE-DEPENDENT NONLINEAR RESISTANCE

This invention relates to ceramic materials having a voltage-dependent nonlinear resistance, suitable for use in varistors known also as voltage-dependent resistors.

Ceramic varistors have found extensive use in electronic instruments for the absorption or suppression of abnormal voltages, noises, etc. Of the various semiconductive ceramic compositions heretofore suggested and used for varistors, perhaps the most typical and pertinent to the instant invention is found in European Patent Application Publication No. 44,981 filed by Taiyo Yuden Co., Ltd. Composed principally of strontium titanate ($SrTiO_3$), the ceramic materials according to this European patent application make possible the provision of varistors capable of functioning not only as such but also as capacitors. The varistors with the dual function can effectively take up glow discharges, arc discharges, abnormal voltages, and noises.

A problem common to this type of varistors is the susceptibility to deterioration of their properties due to voltage or current surges. The proofing of the $SrTiO_3$ ceramic varistors, in particular, against surges will further enhance their practical utility and widen their field of applications.

The present invention provides improved ceramic materials for particular use in varistors, the ceramic materials being of such compositions that the varistor properties will suffer little from surges. The ceramic materials in accordance with another aspect of the invention are further notable for their high nonlinearity coefficients.

Stated broadly, the ceramic materials of this invention consist essentially of 100 mole parts of $SrTiO_3$, from approximately 0.01 to approximately 3.00 mole parts of at least one metal oxide selected from the class consisting of niobium oxide ($Nb_2O_5$), tantalum oxide ($Ta_2O_5$), tungstic oxide ($WO_3$), lanthanum oxide or lanthana ($La_2O_3$), ceric oxide or ceria ($CeO_2$), neodymium oxide or neodymia ($Nd_2O_3$), yttrium oxide or yttria ($Y_2O_3$), samarium oxide ($Sm_2O_3$), praseodymium oxide or praseodymia ($Pr_6O_{11}$), europium oxide or europia ($Eu_2O_3$), and dysprosium oxide or dysprosia ($Dy_2O_3$), and from approximately 0.02 to approximately 2.50 mole parts of sodium monoxide ($Na_2O$).

$SrTiO_3$, the first ingredient, is the principal constituent of the ceramic. The second ingredient, at least one of the listed metal oxides, serves to make the material semiconductive. It is the third ingredient, $Na_2O$, that functions to make surge-proof the varistors made from the ceramic material. Experiment has proved that the application of surges to the varistors hardly affect their properties such as varistor voltages, nonlinearity coefficients, and temperature dependences of the varistor voltages.

According to another feature of the invention, the ceramic materials further comprise from approximately 0.01 to approximately 3.00 mole parts of at least one oxide (fourth ingredient) selected from the class consisting of silver oxide ($Ag_2O$), black copper oxide (CuO), manganese dioxide ($MnO_2$), and silica ($SiO_2$). The addition of the fourth ingredient or ingredients to the above compositions materially improves the nonlinearity coefficients of varistors made from the ceramic materials.

It is to be noted that the claimed compositions are those of the completed ceramic materials, not of those before firing or baking. Thus, instead of $Na_2O$, any one or more of such sodium compounds as sodium fluoride (NaF), sodium chloride (NaCl), sodium bromide (NaBr), and sodium iodide (NaI) may be used as a starting substance or substances. These sodium compounds will be converted into $Na_2O$ by heat treatment during the manufacture of the ceramic materials.

The above and other features and advantages of this invention and the manner of attaining them will become more apparent, and the invention itself will best be understood, from a study of the following description taken together with the attached drawings, in which.

Figure 1:
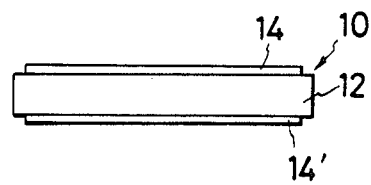
FIG. 1 is a side elevation of one of many similar test varistors fabricated by use of the ceramic materials of various possible compositions in accordance with the invention in order to measure and evaluate their properties.

The invention will now be described in detail in terms of Examples dealing with specific ceramic materials as actually produced and with the properties of varistors made from the ceramic materials. Most of the Examples are in accordance with the principles of the invention, and the others are not. Such noninventive Examples are given here because they, combined with the inventive Examples, are thought to give additional grounds to the claimed proportions of the ingredients. In all these Examples, both inventive and noninventive, and in the claims appended hereto, parts and ratios are molar unless otherwise specified.

EXAMPLES 1-88

$SrTiO_3$ constituting the principal ingredient of the ceramic compositions in accordance with the invention was prepared through the following procedure. Strontium carbonate ($SrCO_3$) and titanium dioxide ($TiO_2$) with a purity of 99.8 percent, were mixed together in a ratio of one to one. The mixture was ball-milled for 10 hours, dried, and then crushed. The crushed $SrCO_3$-$TiO_2$ mixture was fired at a temperature of 1200° C. for two hours and then crushed again. Thus was obtained the desired $SrTiO_3$ in finely divided form.

Eighty-eight different ceramic compositions were formulated by admixing the above prepared $SrTiO_3$ powder with (1) one or more metal oxides (second ingredients) chosen from $Nb_2O_5$, $Ta_2O_5$, $WO_3$, $La_2O_3$, $CeO_2$, $Nd_2O_3$, $Pr_6O_{11}$, $Dy_2O_3$, $Y_2O_3$, $Eu_2O_3$, and $Sm_2O_3$, all in finely divided form and with a purity of 99.0 percent, and (2) one or more sodium compounds (third ingredients) chosen from $Na_2O$, NaF, NaCl, NaBr, and NaI, all in finely divided form and with a purity of 97.0 percent. Table 1 lists the specific ingredients of the eighty-eight ceramic compositions, making up Examples 1-88, and their proportions in mole parts.

TABLE 1

Ceramic Compositions

| Example | First ingredient (SrTiO$_3$), mole part | Second ingredient(s) in use and proportion(s), mole part | Starting third ingredient(s) in use and proportion(s), mole part | Third ingredient (Na$_2$O) after firing, mole part |
|---|---|---|---|---|
| 1 | 100 | Nb$_2$O$_5$, 0.50 | Na$_2$O, 0.01 | 0.01 |
| 2 | 100 | Nb$_2$O$_5$, 0.50 | Na$_2$O, 0.02 | 0.02 |
| 3 | 100 | Nb$_2$O$_5$, 0.50 | Na$_2$O, 0.50 | 0.50 |
| 4 | 100 | Nb$_2$O$_5$, 0.50 | Na$_2$O, 1.00 | 1.00 |
| 5 | 100 | Nb$_2$O$_5$, 0.50 | Na$_2$O, 2.50 | 2.50 |
| 6 | 100 | Nb$_2$O$_5$, 0.50 | Na$_2$O, 3.00 | 3.00 |
| 7 | 100 | La$_2$O$_3$, 1.00 | NaF, 0.02 | 0.01 |
| 8 | 100 | La$_2$O$_3$, 1.00 | NaF, 0.04 | 0.02 |
| 9 | 100 | La$_2$O$_3$, 1.00 | NaF, 1.00 | 0.50 |
| 10 | 100 | La$_2$O$_3$, 1.00 | NaF, 2.00 | 1.00 |
| 11 | 100 | La$_2$O$_3$, 1.00 | NaF, 5.00 | 2.50 |
| 12 | 100 | La$_2$O$_3$, 1.00 | NaF, 6.00 | 3.00 |
| 13 | 100 | Ta$_2$O$_5$, 0.10 | NaCl, 0.02 | 0.01 |
| 14 | 100 | Ta$_2$O$_5$, 0.10 | NaCl, 0.04 | 0.02 |
| 15 | 100 | Ta$_2$O$_5$, 0.10 | NaCl, 1.00 | 0.50 |
| 16 | 100 | Ta$_2$O$_5$, 0.10 | NaCl, 2.00 | 1.00 |
| 17 | 100 | Ta$_2$O$_5$, 0.10 | NaCl, 5.00 | 2.50 |
| 18 | 100 | Ta$_2$O$_5$, 0.10 | NaCl, 6.00 | 3.00 |
| 19 | 100 | WO$_3$, 0.005 | NaBr, 1.00 | 0.50 |
| 20 | 100 | WO$_3$, 0.01 | NaBr, 1.00 | 0.50 |
| 21 | 100 | WO$_3$, 0.50 | NaBr, 1.00 | 0.50 |
| 22 | 100 | WO$_3$, 1.00 | NaBr, 1.00 | 0.50 |
| 23 | 100 | WO$_3$, 2.00 | NaBr, 1.00 | 0.50 |
| 24 | 100 | WO$_3$, 3.00 | NaBr, 1.00 | 0.50 |
| 25 | 100 | WO$_3$, 3.50 | NaBr, 1.00 | 0.50 |
| 26 | 100 | Nd$_2$O$_3$, 0.005 | NaI, 2.00 | 1.00 |
| 27 | 100 | Nd$_2$O$_3$, 0.01 | NaI, 2.00 | 1.00 |
| 28 | 100 | Nd$_2$O$_3$, 0.50 | NaI, 2.00 | 1.00 |
| 29 | 100 | Nd$_2$O$_3$, 1.00 | NaI, 2.00 | 1.00 |
| 30 | 100 | Nd$_2$O$_3$, 2.00 | NaI, 2.00 | 1.00 |
| 31 | 100 | Nd$_2$O$_3$, 3.00 | NaI, 2.00 | 1.00 |
| 32 | 100 | Nd$_2$O$_3$, 3.50 | NaI, 2.00 | 1.00 |
| 33 | 100 | Pr$_6$O$_{11}$, 0.01 | Na$_2$O, 2.50 | 2.50 |
| 34 | 100 | Pr$_6$O$_{11}$, 0.50 | Na$_2$O, 1.00 | 1.00 |
| 35 | 100 | Pr$_6$O$_{11}$, 1.00 | Na$_2$O, 0.50 | 0.50 |
| 36 | 100 | Pr$_6$O$_{11}$, 3.00 | Na$_2$O, 0.02 | 0.02 |
| 37 | 100 | Dy$_2$O$_3$, 0.01 | NaF, 5.00 | 2.50 |
| 38 | 100 | Dy$_2$O$_3$, 1.00 | NaF, 2.00 | 1.00 |
| 39 | 100 | Dy$_2$O$_3$, 3.00 | NaF, 0.04 | 0.02 |
| 40 | 100 | Y$_2$O$_3$, 0.10 | NaBr, 0.04 | 0.02 |
| 41 | 100 | Y$_2$O$_3$, 0.10 | NaBr, 2.00 | 1.00 |
| 42 | 100 | Y$_2$O$_3$, 0.10 | NaBr, 5.00 | 2.50 |
| 43 | 100 | Y$_2$O$_3$, 0.10 | NaBr, 6.00 | 3.00 |
| 44 | 100 | Sm$_2$O$_3$, 0.01 | NaI, 0.04 | 0.02 |
| 45 | 100 | Sm$_2$O$_3$, 0.50 | NaI, 1.00 | 0.50 |
| 46 | 100 | Sm$_2$O$_3$, 1.00 | NaI, 2.00 | 1.00 |
| 47 | 100 | Sm$_2$O$_3$, 3.00 | NaI, 5.00 | 2.50 |
| 48 | 100 | Nb$_2$O$_5$, 0.01 | Na$_2$O, 0.50 | 0.50 |
| 49 | 100 | Nb$_2$O$_5$, 0.50 | NaF, 1.00 | 0.50 |
| 50 | 100 | Nb$_2$O$_5$, 1.00 | NaBr, 1.00 | 0.50 |
| 51 | 100 | Nb$_2$O$_5$, 3.00 | NaCl, 1.00 | 0.50 |
| 52 | 100 | Eu$_2$O$_3$, 0.01 | Na$_2$O, 2.50 | 2.50 |
| 53 | 100 | Eu$_2$O$_3$, 0.50 | Na$_2$O, 1.00 | 1.00 |
| 54 | 100 | Eu$_2$O$_3$, 1.00 | Na$_2$O, 0.50 | 0.50 |
| 55 | 100 | Eu$_2$O$_3$, 3.00 | Na$_2$O, 0.02 | 0.02 |
| 56 | 100 | Nb$_2$O$_5$, 2.00<br>Eu$_2$O$_3$, 1.00 | NaF, 2.00 | 1.00 |
| 57 | 100 | Nb$_2$O$_5$, 0.50<br>Eu$_2$O$_3$, 0.50 | NaF, 2.00 | 1.00 |
| 58 | 100 | Nb$_2$O$_5$, 1.00<br>Eu$_2$O$_3$, 2.00 | NaF, 1.00 | 0.50 |
| 59 | 100 | Nb$_2$O$_5$, 0.005<br>Ta$_2$O$_5$, 0.005 | Na$_2$O, 0.50<br>NaF, 1.00 | 1.00 |
| 60 | 100 | Nb$_2$O$_5$, 0.50<br>Ta$_2$O$_5$, 0.50 | Na$_2$O, 0.50<br>NaF, 1.00 | 1.00 |
| 61 | 100 | Nb$_2$O$_5$, 1.00<br>Ta$_2$O$_5$, 1.00 | Na$_2$O, 0.50<br>NaF, 1.00 | 1.00 |
| 62 | 100 | Nb$_2$O$_5$, 2.00<br>Ta$_2$O$_5$, 1.00 | Na$_2$O, 0.50<br>NaF, 1.00 | 1.00 |
| 63 | 100 | Nb$_2$O$_5$, 1.00<br>Ta$_2$O$_5$, 2.00 | Na$_2$O, 0.50<br>NaF, 1.00 | 1.00 |
| 64 | 100 | Nb$_2$O$_5$, 2.00<br>Ta$_2$O$_5$, 2.00 | Na$_2$O, 0.50<br>NaF, 1.00 | 1.00 |
| 65 | 100 | La$_2$O$_3$, 0.005<br>CeO$_2$, 0.005 | NaCl, 2.00<br>NaBr, 2.00 | 2.00 |
| 66 | 100 | La$_2$O$_3$, 0.50 | NaCl, 2.00 | 2.00 |

TABLE 1-continued

Ceramic Compositions

| Example | First ingredient (SrTiO$_3$), mole part | Second ingredient(s) in use and proportion(s), mole part | Starting third ingredient(s) in use and proportion(s), mole part | Third ingredient (Na$_2$O) after firing, mole part |
|---|---|---|---|---|
| 67 | 100 | CeO$_2$, 0.50<br>La$_2$O$_3$, 1.00 | NaBr, 2.00<br>NaCl, 2.00 | 2.00 |
| 68 | 100 | CeO$_2$, 1.00<br>La$_2$O$_3$, 2.00 | NaBr, 2.00<br>NaCl, 2.00 | 2.00 |
| 69 | 100 | CeO$_2$, 1.00<br>La$_2$O$_3$, 1.00 | NaBr, 2.00<br>NaCl, 2.00 | 2.00 |
| 70 | 100 | CeO$_2$, 2.00<br>La$_2$O$_3$, 2.00 | NaBr, 2.00<br>NaCl, 2.00 | 2.00 |
| 71 | 100 | WO$_3$, 0.20<br>Nd$_2$O$_3$, 0.30 | Na$_2$O, 0.01<br>NaI, 0.02 | 0.02 |
| 72 | 100 | WO$_3$, 0.20<br>Nd$_2$O$_3$, 0.30 | Na$_2$O, 0.50<br>NaI, 1.00 | 1.00 |
| 73 | 100 | WO$_3$, 0.20<br>Nd$_2$O$_3$, 0.30 | Na$_2$O, 1.00<br>NaI, 2.00 | 2.00 |
| 74 | 100 | WO$_3$, 0.20<br>Nd$_2$O$_3$, 0.30 | Na$_2$O, 1.50<br>NaI, 2.00 | 2.50 |
| 75 | 100 | WO$_3$, 0.20<br>Nd$_2$O$_3$, 0.30 | Na$_2$O, 1.00<br>NaI, 3.00 | 2.50 |
| 76 | 100 | WO$_3$, 0.20<br>Nd$_2$O$_3$, 0.30 | Na$_2$O, 1.50<br>NaI, 3.00 | 3.00 |
| 77 | 100 | Pr$_6$O$_{11}$, 0.005<br>Dy$_2$O$_3$, 0.005 | NaF, 0.60<br>NaCl, 0.40 | 0.50 |
| 78 | 100 | Dy$_2$O$_3$, 0.20<br>Y$_2$O$_3$, 0.30 | NaF, 1.00<br>NaI, 1.00 | 1.00 |
| 79 | 100 | Nb$_2$O$_5$, 0.50<br>Nd$_2$O$_3$, 0.50 | Na$_2$O, 0.50<br>NaF, 1.00<br>NaI, 1.00 | 1.50 |
| 80 | 100 | WO$_3$, 1.00<br>Ta$_2$O$_5$, 1.00 | NaCl, 2.00<br>NaBr, 2.00<br>NaI, 1.00 | 2.50 |
| 81 | 100 | Y$_2$O$_3$, 1.00<br>Sm$_2$O$_3$, 2.00 | Na$_2$O, 0.01<br>NaI, 0.02 | 0.02 |
| 82 | 100 | Nb$_2$O$_5$, 0.50<br>Ta$_2$O$_5$, 0.50<br>WO$_3$, 0.50 | Na$_2$O, 0.20<br>NaBr, 0.60<br>NaI, 1.00 | 1.00 |
| 83 | 100 | La$_2$O$_3$, 1.50<br>CeO$_2$, 1.00<br>Nd$_2$O$_3$, 1.00 | NaF, 2.00 | 1.00 |
| 84 | 100 | Nb$_2$O$_5$, 0.30<br>Pr$_6$O$_{11}$, 0.20<br>Y$_2$O$_3$, 0.50 | NaF, 2.00<br>NaCl, 2.00<br>Na$_2$O, 1.00 | 3.00 |
| 85 | 100 | Ta$_2$O$_5$, 1.00 | Na$_2$O, 0.01<br>NaI, 0.02 | 0.02 |
| 86 | 100 | Dy$_2$O$_3$, 0.005<br>Y$_2$O$_3$, 0.005<br>Sm$_2$O$_3$, 0.005 | Na$_2$O, 1.00 | 1.00 |
| 87 | 100 | Nb$_2$O$_5$, 0.50<br>Ta$_2$O$_5$, 0.50<br>WO$_3$, 0.50<br>La$_2$O$_3$, 0.50 | Na$_2$O, 0.10<br>NaF, 0.20<br>NaCl, 0.20<br>NaBr, 0.20 | 0.40 |
| 88 | 100 | La$_2$O$_3$, 0.10<br>CeO$_2$, 0.10<br>Nd$_2$O$_3$, 0.10<br>Pr$_6$O$_{11}$, 0.10 | NaF, 1.00<br>NaCl, 1.00<br>NaBr, 1.00<br>NaI, 1.00 | 2.00 |

Charged into a mortar, each mixture was stirred for 20 hours in a dry state. In order to process the mixtures into ceramic test discs, approximately 10–15 percent by weight polyvinyl alcohol was added and blended in to serve as a temporary binder. The mixtures were molded into discs by pressing at approximately 1500 kilograms per square centimeter. The discs were fired at approximately 1350° C., for four hours, in a reductive atmosphere consisting of 95 percent by capacity molecular nitrogen (N$_2$) and five percent by capacity molecular hydrogen (H$_2$). Each semiconductive ceramic test disc thus fabricated had a diameter of 10 millimeters and a thickness of 0.8 millimeter. The discs were further put to oxidative heat treatment, in air, at a temperature in the range from 1000° to 1200° C., for three hours. The heating of the discs converted their NaF, NaCl, NaBr and NaI contents into Na$_2$O. The other ingredients remained unchanged. Table 1 gives, therefore, only the Na$_2$O contents of the discs after their firing.

The ceramic test discs fabricated as above were further processed into test varistors by being electroded with a commercial silver electroding composition. FIG. 1 shows one such test varistor, generally reference 10. The test varistor 10 has a ceramic disc 12 beaing a pair of electrodes 14 and 14' on its opposite faces. These electrodes were formed by coating the opposite disc faces with the silver paste, as the silver electroding composition is commonly so called, and by firing the coatings at 800° C.

The thus prepared test varistors, having the ceramic bodies mostly composed in accordance with the teachings of the invention, were then tested as to varistor voltage ($V_1$), nonlinearity coefficient ($\alpha$), temperature dependence ($\Delta V_1$) of the varistor voltage, capacitance (C), percent variations ($\Delta V_{1P}$ and $\Delta \alpha_P$) of the varistor voltage and nonlinearity coefficient after application of high voltage pulses or surges, and temperature dependence ($\Delta V_{1T}$) of the varistor voltage after surge application. Table 2 represents the results. The following paragraphs deal with the methods adopted for the measurement of these properties of the test varistors.

Figure 2:
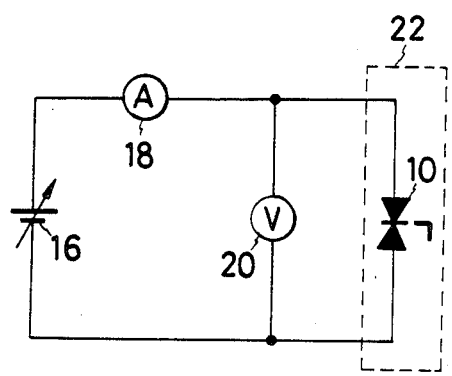
FIG. 2 is a schematic electrical diagram of a circuit for testing some properties of the test varistors.

For the measurement of varistor voltages there was employed the circuit of FIG. 2. It will be seen from this figure that a constant current source 16 is connected in circuit with each test varistor 10. The circuit further comprises an ammeter 18 connected between current source 16 and test varistor 10, and a voltmeter 20 connected in parallel with the test varistor. The test varistor was placed within a thermostatic vessel depicted by the dashed outline referenced 22, in which the temperature was maintained at 20° C. An electric current ($I_1$) of one milliampere was made to flow from current source 16 to test varistor 10, and the reading of the voltmeter 20 at that time was taken as the varistor voltage ($V_1$) of the test varistor.

The circuit of FIG. 2 was also used for the determination of nonlinearity coefficients. As for the measurement of varistor voltages a current ($I_{10}$) of 10 milliamperes was made to flow from current source 16 to each test varistor 10, and the voltage ($V_{10}$) across the varistor was measured by the voltmeter 20. The nonlinearity coefficient ($\alpha$) was computed by $$\alpha = \frac{\log (I_{10}/I_1)}{\log (V_{10}/V_1)} = \frac{1}{\log (V_{10}/V_1)}$$

The temperature dependence of the varistor voltage was also ascertained by use of the FIG. 2 circuit. The temperature in the thermostatic vessel 22 was varied in the range from −40° to +125° C. At each temperature (T, °C.) a varistor voltage ($V_{1T}$) was measured when a current of one milliampere flowed from current source 16 to each test varistor 20 in the vessel 22. The temperature dependence ($V_1$) of the varistor voltage was determined by computing the variation of the varistor voltage ($V_{1T}$) at each temperature from the varistor voltage ($V_1$) at 20° C., in accordance with the equation $$V_1 = \frac{V_{1T} - V_1}{V_1} \times \frac{100}{T(°C.) - 20(°C.)} \ (\%/°C.)$$

The tabulated figures represent only the maximum variations in the noted temperature range.

Figure 3:
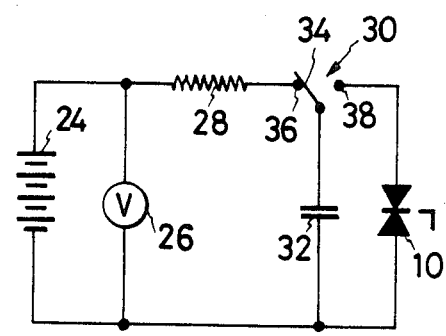
FIG. 3 is a similar diagram of a circuit for applying surges to the test varistors, in order to re-examine their properties after the surge application.

FIG. 3 shows a circuit used for the application of surges to the test varistors, in order to examine the extents to which the above three properties are affected by the surges. The surge application circuit has a constant DC voltage source 24 of two kilovolts, connected in parallel with a voltmeter 26. The power source 24 is further connected via a five-ohm resistor 28 and a single-pole double-throw switch 30 to a 2.5-microfarad capacitor 32, which in turn is connected in parallel with each test varistor 10 via the switch 30. This switch has a movable contact 34 connected to the capacitor 32, a first fixed contact 36 connected to the power source 24 via the resistor 28, and a second fixed contact 38 connected to the test varistor 10. The capacitor 32 is charged during engagement of the movable contact 34 with the first fixed contact 36 and is discharged upon engagement of the movable contact with the second fixed contact 38 for the application of a surge to the test varistor 10.

By use of the FIG. 3 circuit configured as above, five successive surges were applied to each test varistor 10 at time intervals of three seconds. The surge-applied test varistor 10 was again connected in the circuit of FIG. 2 to re-examine its varistor voltage ($V_{1P}$) and nonlinearity coefficient ($\alpha_P$). The percent variation ($\alpha V_{1P}$) of the varistor voltage after the surge application was computed by $$\Delta V_{1p} = \frac{V_{1p} - V_1}{V_1} \times 100 \ (\%)$$

The percent variation ($\Delta \alpha_P$) of the nonlinearity coefficient after the surge application was computed by $$\Delta \alpha_P = \frac{\alpha_P - \alpha}{\alpha} \times 100 \ (\%)$$

The temperature dependence ($\alpha V_{1T}$) of the varistor voltage after the surge application was ascertained by the FIG. 2 circuit in the same manner as the temperature dependence ($\alpha V_1$) before surge application.

The capacitances (C) of the test varistors were measured at one kilohertz and tabulated in nanofarad (nF).

In Table 2 and in all the subsequent tables setting forth the properties of additional test varistors, the figures represent the averages of ten specimens of each Example.

TABLE 2

| | Varistor Properties | | | | | | |
|---|---|---|---|---|---|---|---|
| Example | $V_1$, V | $\alpha$ | $\Delta V_1$, %/°C. | C, nF | $\Delta V_{1P}$, % | $\Delta \alpha_P$, % | $\Delta V_{1T}$, %/°C. |
| 1 | 22.9 | 10.2 | −0.08 | 77 | −7.3 | −6.9 | −0.13 |
| 2 | 17.4 | 16.5 | −0.05 | 120 | −0.9 | −0.8 | −0.05 |
| 3 | 18.3 | 19.8 | −0.04 | 128 | −0.7 | −0.7 | −0.04 |
| 4 | 18.5 | 20.4 | −0.04 | 150 | −0.4 | −0.5 | −0.04 |
| 5 | 20.5 | 19.9 | −0.04 | 146 | −0.7 | −0.6 | −0.04 |
| 6 | 26.9 | 7.1 | −0.12 | 96 | −4.8 | −4.3 | −0.14 |
| 7 | 25.8 | 9.4 | −0.08 | 68 | −6.4 | −6.9 | −0.15 |
| 8 | 20.8 | 17.7 | −0.04 | 104 | −0.9 | −1.0 | −0.05 |
| 9 | 27.6 | 17.5 | −0.04 | 121 | −0.7 | −0.8 | −0.04 |
| 10 | 33.7 | 20.0 | −0.03 | 142 | −0.6 | −0.6 | −0.03 |
| 11 | 30.5 | 19.6 | −0.04 | 127 | −0.6 | −0.7 | −0.04 |
| 12 | 32.3 | 6.1 | −0.17 | 89 | −7.2 | −7.1 | −0.19 |
| 13 | 11.0 | 9.1 | −0.11 | 69 | −8.4 | −8.7 | −0.14 |

TABLE 2-continued

| Example | $V_1$, V | α | $\Delta V_1$, %/°C | C, nF | $\Delta V_{1P}$, % | $\Delta a_P$, % | $\Delta V_{1T}$, %/°C |
|---|---|---|---|---|---|---|---|
| 14 | 14.3 | 16.0 | −0.05 | 115 | −1.0 | −1.0 | −0.05 |
| 15 | 14.0 | 17.5 | −0.04 | 132 | −0.8 | −0.8 | −0.04 |
| 16 | 13.7 | 17.7 | −0.04 | 145 | −0.7 | −0.7 | −0.04 |
| 17 | 16.6 | 18.0 | −0.04 | 130 | −0.9 | −0.8 | −0.04 |
| 18 | 19.6 | 5.9 | −0.20 | 99 | −10.5 | −10.2 | −0.25 |
| 19 | 12.7 | 5.8 | −0.24 | 82 | −16.6 | −15.9 | −0.30 |
| 20 | 10.9 | 15.6 | −0.05 | 140 | −1.0 | −1.0 | −0.05 |
| 21 | 14.4 | 19.6 | −0.04 | 165 | −0.7 | −0.7 | −0.04 |
| 22 | 13.3 | 21.0 | −0.03 | 159 | −0.7 | −0.8 | −0.03 |
| 23 | 13.5 | 20.3 | −0.04 | 142 | −0.7 | −0.7 | −0.04 |
| 24 | 16.5 | 17.4 | −0.05 | 129 | −0.8 | −0.8 | −0.05 |
| 25 | 10.9 | 7.1 | −0.21 | 70 | −9.1 | −8.7 | −0.25 |
| 26 | 27.2 | 6.7 | −0.15 | 90 | −9.2 | −9.1 | −0.21 |
| 27 | 33.5 | 17.7 | −0.05 | 153 | −0.9 | −0.8 | −0.05 |
| 28 | 36.0 | 21.5 | −0.04 | 169 | −0.7 | −0.7 | −0.04 |
| 29 | 33.9 | 20.4 | −0.04 | 130 | −0.6 | −0.6 | −0.04 |
| 30 | 30.1 | 18.2 | −0.04 | 124 | −0.6 | −0.5 | −0.04 |
| 31 | 29.0 | 18.0 | −0.05 | 107 | −0.7 | −0.7 | −0.05 |
| 32 | | | | Not coherently bonded on firing. | | | |
| 33 | 10.4 | 17.8 | −0.04 | 111 | −0.6 | −0.6 | −0.04 |
| 34 | 14.3 | 19.0 | −0.04 | 150 | −0.4 | −0.4 | −0.04 |
| 35 | 13.0 | 18.6 | −0.04 | 138 | −0.7 | −0.7 | −0.04 |
| 36 | 16.7 | 17.0 | −0.04 | 94 | −1.0 | −1.0 | −0.04 |
| 37 | 32.6 | 16.3 | −0.05 | 99 | −0.6 | −0.7 | −0.05 |
| 38 | 38.6 | 20.4 | −0.03 | 132 | −0.5 | −0.6 | −0.03 |
| 39 | 30.8 | 17.1 | −0.04 | 100 | −0.9 | −1.0 | −0.04 |
| 40 | 9.4 | 16.7 | −0.05 | 101 | −0.8 | −0.8 | −0.05 |
| 41 | 11.2 | 19.7 | −0.04 | 154 | −0.6 | −0.6 | −0.04 |
| 42 | 10.5 | 19.6 | −0.04 | 137 | −0.7 | −0.7 | −0.04 |
| 43 | 13.5 | 6.3 | −0.23 | 102 | −9.5 | −8.9 | −0.28 |
| 44 | 38.9 | 17.2 | −0.04 | 90 | −1.0 | −0.9 | −0.05 |
| 45 | 41.5 | 21.4 | −0.03 | 130 | −0.7 | −0.7 | −0.03 |
| 46 | 43.2 | 21.7 | −0.03 | 135 | −0.6 | −0.6 | −0.03 |
| 47 | 39.6 | 19.0 | −0.04 | 121 | −0.8 | −0.8 | −0.04 |
| 48 | 16.0 | 18.0 | −0.04 | 120 | −0.9 | −0.9 | −0.04 |
| 49 | 19.9 | 20.0 | −0.03 | 152 | −0.5 | −0.5 | −0.03 |
| 50 | 20.1 | 21.4 | −0.03 | 124 | −0.7 | −0.6 | −0.03 |
| 51 | 25.0 | 19.3 | −0.03 | 116 | −0.9 | −0.9 | −0.03 |
| 52 | 19.6 | 17.0 | −0.04 | 107 | −0.7 | −0.7 | −0.04 |
| 53 | 18.7 | 19.4 | −0.04 | 136 | −0.5 | −0.5 | −0.04 |
| 54 | 20.4 | 20.3 | −0.04 | 116 | −0.7 | −0.7 | −0.04 |
| 55 | 19.2 | 18.0 | −0.04 | 88 | −1.0 | −1.0 | −0.04 |
| 56 | 24.4 | 20.5 | −0.04 | 125 | −0.7 | −0.8 | −0.04 |
| 57 | 22.2 | 21.9 | −0.03 | 142 | −0.5 | −0.5 | −0.03 |
| 58 | 23.5 | 16.5 | −0.04 | 110 | −0.6 | −0.6 | −0.04 |
| 59 | 12.1 | 17.1 | −0.05 | 128 | −0.7 | −0.7 | −0.05 |
| 60 | 13.1 | 20.5 | −0.03 | 162 | −0.6 | −0.6 | −0.03 |
| 61 | 10.0 | 19.1 | −0.04 | 135 | −0.6 | −0.7 | −0.04 |
| 62 | 15.4 | 17.2 | −0.05 | 112 | −0.8 | −0.8 | −0.05 |
| 63 | 13.7 | 16.8 | −0.05 | 120 | −0.8 | −0.9 | −0.05 |
| 64 | 11.8 | 4.1 | −0.24 | 60 | −14.0 | −14.6 | −0.35 |
| 65 | 26.0 | 16.5 | −0.05 | 126 | −0.7 | −0.7 | −0.05 |
| 66 | 28.6 | 19.0 | −0.04 | 148 | −0.5 | −0.5 | −0.04 |
| 67 | 32.0 | 17.9 | −0.05 | 120 | −0.6 | −0.6 | −0.05 |
| 68 | 28.3 | 16.0 | −0.05 | 100 | −0.8 | −0.9 | −0.04 |
| 69 | 26.4 | 16.3 | −0.05 | 96 | −0.8 | −0.8 | −0.05 |
| 70 | | | | Not coherently bonded on firing. | | | |
| 71 | 34.7 | 16.7 | −0.05 | 103 | −1.0 | −1.0 | −0.05 |
| 72 | 35.7 | 21.1 | −0.03 | 134 | −0.6 | −0.7 | −0.03 |
| 73 | 33.6 | 21.0 | −0.03 | 141 | −0.6 | −0.6 | −0.03 |
| 74 | 35.4 | 19.4 | −0.04 | 117 | −0.8 | −0.9 | −0.04 |
| 75 | 33.2 | 19.1 | −0.04 | 107 | −0.9 | −1.0 | −0.04 |
| 76 | 36.0 | 6.2 | −0.14 | 66 | −12.1 | −12.2 | −0.20 |
| 77 | 12.4 | 15.9 | −0.05 | 137 | −0.8 | −0.8 | −0.05 |
| 78 | 14.3 | 20.8 | −0.03 | 159 | −0.7 | −0.8 | −0.03 |
| 79 | 13.0 | 19.9 | −0.03 | 164 | −0.5 | −0.5 | −0.03 |
| 80 | 15.7 | 17.4 | −0.05 | 142 | −0.7 | −0.7 | −0.05 |
| 81 | 14.6 | 16.2 | −0.05 | 110 | −1.0 | −1.0 | −0.05 |
| 82 | 27.6 | 19.1 | −0.04 | 134 | −0.7 | −0.6 | −0.04 |
| 83 | | | | Not coherently bonded on firing. | | | |
| 84 | 30.4 | 7.3 | −0.15 | 73 | −13.0 | −14.5 | −0.20 |
| 85 | 26.2 | 17.2 | −0.05 | 97 | −1.0 | −1.0 | −0.05 |
| 86 | 29.5 | 18.4 | −0.04 | 160 | −0.8 | −0.8 | −0.04 |
| 87 | 27.5 | 20.7 | −0.03 | 116 | −0.6 | −0.6 | −0.03 |
| 88 | 25.9 | 19.5 | −0.04 | 146 | −0.7 | −0.7 | −0.04 |

A fair evaluation of the tabulated properties of the test varistors requires their comparison with those of conventional SrTiO$_3$ varistors. Of the various known varistors of this class, the one having its ceramic body composed of 100 moles of SrTiO$_3$, 0.5 mole of Nb$_2$O$_5$, and 0.5 mole of manganese dioxide has perhaps the most excellent properties. Ten test varistors of this composition were therefore fabricated by a known method to ascertain their properties.

Measured by the same means and the same methods as above, the varistor voltages of the ten prior art SrTiO$_3$ test varistors averaged 13.2 volts; their nonlinearity coefficients 13.5; the temperature dependences of their varistor voltages −0.08 percent per °C.; their capacitances 165 nanofarads; the percent variations of their varistor voltages after surge application −35.2 percent; the percent variations of their nonlinearity coefficients after surge application −40.6 percent; and the temperature dependences of their varistor voltages after surge application −0.20 percent per °C.

As has been stated, the ceramic materials in accordance with the invention comprise 100 parts of SrTiO$_3$, from about 0.01 to about 3.00 parts of at least one of the above enumerated metal oxides, and from about 0.02 to about 2.50 parts of Na$_2$O. Table 2 demonstrates that the absolute values of the percent variations ($\Delta V_{1P}$) of the varistor voltages after surge application of the test varistors of of the above compositions are all not more than one, compared with the average percent variation of −35.2 exhibited by the prior art SrTiO$_3$ varistors.

It will also be noted from Table 2 that the absolute values of the percent variations ($\Delta \alpha_p$) of the nonlinearity coefficients after surge application are all not more than one in accordance with the invention. This is also a remarkable improvement in view of the average percent variation of −40.6 in accordance with the prior art. Further the absolute values of the temperature dependences ($\Delta V_{1T}$) of the varistor voltages after surge application are all not more than 0.1 (%/°C.) in accordance with the invention, compared with −0.2 in accordance with the prior art.

The other tested properties of the varistors in accordance with the invention are just as favorable. Their varistor voltages ($V_1$) range from 9.4 to 43.2 volts, making them suitable for use in electronic systems with a voltage rating in the range from five to 12 volts. Also the varistors in accordance with the invention have nonlinearity coefficients ($\alpha$) of at least 15. The absolute values of the temperature dependences ($\Delta V_1$) of their varistor voltages are not more than 0.05 (%/°C.). Their capacitances (C) are not less than 90 nanofarads (apparent relative permittivity not less than $1.62 \times 10^5$).

Attention is now directed to Examples 1, 7 and 13 of Table 1, which contain less than 0.02 part of Na$_2$O, the third ingredient, after firing. As will be noted from Table 2, the absolute values of the percent variations of their varistor voltages and nonlinearity coefficients after surge application are all greater than one. The absolute values of the temperature dependences of their varistor voltages after surge application are greater than 0.1. Examples 6, 12, 18, 43, 76 and 84, on the other hand, contain more than 2.50 parts of Na$_2$O. The absolute values of the percent variations of their varistor voltages and nonlinearity coefficients after surge application are also greater than one, and the absolute values of the temperature dependences of their varistor voltages after surge application are greater than 0.1. Consequently, for the provision of varistors capable of well withstanding voltage or current surges, the Na$_2$O contents of the ceramic materials should be in the range from about 0.02 to about 2.50 parts, preferably from 0.5 to 1.0 part.

Examples 19 and 26 contain less than 0.01 part of WO$_3$ and Nd$_2$O$_3$ (second ingredients) respectively and so are not rendered sufficiently semiconductive. The results are the low nonlinearity coefficients, the high absolute values of the temperature dependences of the varistor voltages, and the high absolute values of the percent variations and temperature dependences of the varistor voltages after surge application.

Examples 25, 32, 64, 70 and 83 contain more than 3.00 parts of the second ingredients. The test discs of some of these Examples were not coherently bonded on firing, whereas the others have poor properties even though their test discs were coherently bonded on firing. Thus the contents of the second ingredients in the ceramic materials of this invention are set in the range from about 0.01 to about 3.00 parts, preferably from 0.5 to 2.0 parts.

It is seen from the preceding three paragraphs that Examples 1, 6, 7, 12, 13, 18, 19, 25, 26, 32, 43, 64, 76, 83 and 84 fall outside the purview of this invention.

Examples 56 to 88 each contain two or more second ingredients and/or two or more third ingredients as starting substances. It will be observed from Table 2 that the properties of these Examples are just as favorable as those of the other Examples containing only one second ingredient and only one third ingredient.

EXAMPLES 89–136

It will be recalled that in Examples 1–88, the moldings of the various ceramic compositions were put to the oxidative heat treatment, in air, at temperatures ranging from 1000° to 1200° C., for three hours during the fabrication of the test discs. In Examples 89–136, then, the oxidative heat treatment was effected at six different temperatures ($T_H$) of 850°, 950°, 1050°, 1150°, 1250° and 1350° C., for two hours at each temperature, in order to ascertain the relations between the temperatures and the properties of the resulting varistors.

The ceramic compositions tested in these Examples were the same as those of Examples 3, 10, 17, 27, 38, 60, 82 and 88. The various mixtures of selected ingredients were processed into varistors through the same procedure as in Examples 1–88 except that the molded discs of each composition were subjected to the oxidative heat treatment at the six different temperatures ($T_H$). Table 3 gives the seven properties in question of the varistors thus fabricated mostly in accordance with the invention. The properties were measured by the same methods and by the same means as in Examples 1–88.

TABLE 3

| | | Ceramic Compositions & Varistor Properties | | | | | | | |
|---|---|---|---|---|---|---|---|---|---|
| Example | Composition | $T_H$ °C. | $V_1$ V | $\alpha$ | $\Delta V_1$ %/°C. | C. nF | $\Delta V_{1P}$ % | $\Delta \alpha_p$ % | $\Delta V_{1T}$ %/°C. |
| | Same as: | | | | | | | | |
| 89 | Example 3 | 850 | 2.8 | 10.6 | −0.07 | 204 | −3.3 | −3.2 | −0.08 |
| 90 | Example 3 | 950 | 6.4 | 15.8 | −0.05 | 177 | −1.0 | −0.9 | −0.05 |
| 91 | Example 3 | 1050 | 13.2 | 18.4 | −0.04 | 135 | −0.7 | −0.7 | −0.04 |
| 92 | Example 3 | 1150 | 24.5 | 21.2 | −0.03 | 116 | −0.6 | −0.6 | −0.03 |
| 93 | Example 3 | 1250 | 40.5 | 23.5 | −0.03 | 102 | −0.5 | −0.5 | −0.03 |

TABLE 3-continued

| | | | | | | | | | |
|---|---|---|---|---|---|---|---|---|---|
| | | | | | Ceramic Compositions & Varistor Properties | | | | |
| Example | Composition | $T_H$, °C. | $V_1$, V | $\alpha$ | $\Delta V_1$, %/°C. | C, nF | $\Delta V_{1P}$, % | $\Delta \alpha_P$, % | $\Delta V_{1T}$, %/°C. |
| 94 | Example 3 | 1350 | 72.9 | 24.5 | −0.03 | 96 | −0.5 | −0.5 | −0.03 |
| 95 | Example 10 | 850 | 4.5 | 9.9 | −0.06 | 220 | −3.0 | −3.3 | −0.08 |
| 96 | Example 10 | 950 | 11.2 | 14.5 | −0.05 | 189 | −1.2 | −1.3 | −0.05 |
| 97 | Example 10 | 1050 | 18.5 | 16.2 | −0.05 | 171 | −0.9 | −0.9 | −0.05 |
| 98 | Example 10 | 1150 | 30.0 | 19.5 | −0.04 | 145 | −0.6 | −0.6 | −0.04 |
| 99 | Example 10 | 1250 | 56.9 | 20.0 | −0.03 | 118 | −0.5 | −0.5 | −0.03 |
| 100 | Example 10 | 1350 | 90.1 | 21.1 | −0.03 | 109 | −0.5 | −0.5 | −0.03 |
| 101 | Example 17 | 850 | 6.0 | 15.6 | −0.05 | 162 | −1.0 | −1.0 | −0.05 |
| 102 | Example 17 | 950 | 10.8 | 18.7 | −0.04 | 136 | −0.9 | −0.8 | −0.04 |
| 103 | Example 17 | 1050 | 21.4 | 20.5 | −0.04 | 120 | −0.7 | −0.8 | −0.04 |
| 104 | Example 17 | 1150 | 39.9 | 22.0 | −0.03 | 110 | −0.6 | −0.6 | −0.03 |
| 105 | Example 17 | 1250 | 80.2 | 24.0 | −0.03 | 99 | −0.6 | −0.6 | −0.03 |
| 106 | Example 17 | 1350 | 183.1 | 24.9 | −0.03 | 90 | −0.6 | −0.6 | −0.03 |
| 107 | Example 27 | 850 | 12.4 | 15.2 | −0.05 | 191 | −1.0 | −1.0 | −0.05 |
| 108 | Example 27 | 950 | 25.7 | 17.4 | −0.04 | 160 | −0.8 | −0.8 | −0.04 |
| 109 | Example 27 | 1050 | 43.5 | 19.1 | −0.04 | 126 | −0.7 | −0.7 | −0.04 |
| 110 | Example 27 | 1150 | 86.0 | 20.0 | −0.03 | 101 | −0.7 | −0.6 | −0.03 |
| 111 | Example 27 | 1250 | 167.6 | 21.0 | −0.03 | 83 | −0.5 | −0.5 | −0.03 |
| 112 | Example 27 | 1350 | 273.1 | 21.9 | −0.03 | 76 | −0.4 | −0.5 | −0.03 |
| 113 | Example 38 | 850 | 12.1 | 15.7 | −0.05 | 190 | −0.9 | −0.9 | −0.05 |
| 114 | Example 38 | 950 | 17.0 | 17.9 | −0.05 | 163 | −0.6 | −0.7 | −0.05 |
| 115 | Example 38 | 1050 | 36.4 | 20.1 | −0.03 | 140 | −0.5 | −0.5 | −0.03 |
| 116 | Example 38 | 1150 | 47.7 | 21.7 | −0.03 | 104 | −0.4 | −0.4 | −0.03 |
| 117 | Example 38 | 1250 | 135.0 | 23.2 | −0.03 | 90 | −0.4 | −0.4 | −0.03 |
| 118 | Example 38 | 1350 | 248.2 | 24.1 | −0.03 | 81 | −0.4 | −0.4 | −0.03 |
| 119 | Example 60 | 850 | 3.0 | 13.0 | −0.06 | 191 | −2.3 | −2.5 | −0.06 |
| 120 | Example 60 | 950 | 8.6 | 19.1 | −0.04 | 176 | −0.7 | −0.7 | −0.04 |
| 121 | Example 60 | 1050 | 22.0 | 21.5 | −0.03 | 160 | −0.6 | −0.6 | −0.03 |
| 122 | Example 60 | 1150 | 37.3 | 23.2 | −0.03 | 137 | −0.5 | −0.5 | −0.03 |
| 123 | Example 60 | 1250 | 60.4 | 24.3 | −0.02 | 107 | −0.5 | −0.5 | −0.02 |
| 124 | Example 60 | 1350 | 91.1 | 25.2 | −0.02 | 86 | −0.4 | −0.4 | −0.02 |
| 125 | Example 82 | 850 | 7.7 | 11.6 | −0.07 | 169 | −1.3 | −2.4 | −0.08 |
| 126 | Example 82 | 950 | 19.7 | 16.1 | −0.05 | 142 | −0.8 | −0.8 | −0.05 |
| 127 | Example 82 | 1050 | 34.6 | 19.0 | −0.04 | 128 | −0.6 | −0.6 | −0.04 |
| 128 | Example 82 | 1150 | 53.7 | 20.5 | −0.04 | 113 | −0.5 | −0.5 | −0.04 |
| 129 | Example 82 | 1250 | 76.4 | 22.2 | −0.03 | 97 | −0.4 | −0.4 | −0.03 |
| 130 | Example 82 | 1350 | 150.2 | 23.7 | −0.03 | 94 | −0.4 | −0.4 | −0.03 |
| 131 | Example 88 | 850 | 3.0 | 10.4 | −0.07 | 220 | −2.9 | −3.1 | −0.08 |
| 132 | Example 88 | 950 | 7.4 | 13.0 | −0.06 | 192 | −1.5 | −1.4 | −0.06 |
| 133 | Example 88 | 1050 | 16.3 | 17.1 | −0.05 | 164 | −1.0 | −1.0 | −0.05 |
| 134 | Example 88 | 1150 | 25.0 | 19.5 | −0.04 | 145 | −0.7 | −0.7 | −0.04 |
| 135 | Example 88 | 1250 | 41.7 | 21.3 | −0.03 | 104 | −0.6 | −0.6 | −0.03 |
| 136 | Example 88 | 1350 | 80.6 | 22.9 | −0.03 | 93 | −0.6 | −0.5 | −0.03 |

Table 3 proves that the varistor voltages ($V_1$) of each group of test varistors become greater with the higher temperatures of the oxidative heat treatment. The varistor voltages of those varistors whose nonlinearity coefficients are more than 10 differ up to about 30 times as much in each group. For instance, the varistor voltages range from 2.8 to 72.9 volts in Examples 89–94, and from 4.5 to 90.1 volts in Examples 95–100. This means that the invention makes possible the provision of varistors of the same size and composition but of different properties, resulting in the lower manufacturing costs of such varistors. A preferred temperature range of the oxidative heat treatment for the provision of surge-proof varistors is from about 950° to 1350° C.

EXAMPLES 137–218

As set forth in Table 4, various mixtures of the first, second and third ingredients, in various proportions, were each admixed with one or more fourth ingredients selected from among $Ag_2O$, $CuO$, $MnO_2$, and $SiO_2$, in various proportions, to prepare eighty-two different ceramic compositions of Examples 137–218. Table 4 does not recite the first ingredient, $SrTiO_3$, because its contents are fixed at 100 parts in all the ceramic compositions. As with Examples 1–88, most of Examples 137–218 are in conformity with the principles of the invention, and the others are not, as will be later discussed in more detail.

TABLE 4

| | Ceramic Compositions (Aside from 100 mole parts $SrTiO_3$) | | | |
|---|---|---|---|---|
| Example | Second ingredient(s) in use and proportion(s), mole part | Starting third ingredient(s) in use and proportion(s), mole part | Fourth ingredient(s) in use and proportion(s), mole part | Third ingredient ($Na_2O$) after firing, mole part |
| 137 | $Nb_2O_5$, 0.50 | $Na_2O$, 1.00 | $Ag_2O$, 0.01 | 1.00 |
| 138 | $Nb_2O_5$, 0.50 | $Na_2O$, 1.00 | $Ag_2O$, 0.50 | 1.00 |
| 139 | $Nb_2O_5$, 0.50 | $Na_2O$, 1.00 | $Ag_2O$, 1.00 | 1.00 |
| 140 | $Nb_2O_5$, 0.50 | $Na_2O$, 1.00 | $Ag_2O$, 3.00 | 1.00 |
| 141 | $Nb_2O_5$, 0.50 | $Na_2O$, 1.00 | $Ag_2O$, 3.50 | 1.00 |
| 142 | $Nb_2O_5$, 0.50 | $Na_2O$, 1.00 | — | 1.00 |
| 143 | $Ta_2O_5$, 0.10 | NaF, 1.00 | CuO, 0.01 | 0.50 |

TABLE 4-continued

Ceramic Compositions (Aside from 100 mole parts SrTiO₃)

| Example | Second ingredient(s) in use and proportion(s), mole part | Starting third ingredient(s) in use and proportion(s), mole part | Fourth ingredient(s) in use and proportion(s), mole part | Third ingredient (Na₂O) after firing, mole part |
|---|---|---|---|---|
| 144 | Ta₂O₅, 0.10 | NaF, 1.00 | CuO, 0.50 | 0.50 |
| 145 | Ta₂O₅, 0.10 | NaF, 1.00 | CuO, 1.00 | 0.50 |
| 146 | Ta₂O₅, 0.10 | NaF, 1.00 | CuO, 3.00 | 0.50 |
| 147 | Ta₂O₅, 0.10 | NaF, 1.00 | CuO, 3.50 | 0.50 |
| 148 | Ta₂O₅, 0.10 | NaF, 1.00 | — | 0.50 |
| 149 | La₂O₃, 1.00 | NaF, 0.04 | MnO₂, 0.01 | 0.02 |
| 150 | La₂O₃, 1.00 | NaF, 0.04 | MnO₂, 0.50 | 0.02 |
| 151 | La₂O₃, 1.00 | NaF, 0.04 | MnO₂, 1.00 | 0.02 |
| 152 | La₂O₃, 1.00 | NaF, 0.04 | MnO₂, 3.00 | 0.02 |
| 153 | La₂O₃, 1.00 | NaF, 0.04 | MnO₂, 3.50 | 0.02 |
| 154 | La₂O₃, 1.00 | NaF, 0.04 | — | 0.02 |
| 155 | Pr₆O₁₁, 3.00 | Na₂O, 2.00 | SiO₂, 0.01 | 2.00 |
| 156 | Pr₆O₁₁, 3.00 | Na₂O, 2.00 | SiO₂, 0.50 | 2.00 |
| 157 | Pr₆O₁₁, 3.00 | Na₂O, 2.00 | SiO₂, 1.00 | 2.00 |
| 158 | Pr₆O₁₁, 3.00 | Na₂O, 2.00 | SiO₂, 3.00 | 2.00 |
| 159 | Pr₆O₁₁, 3.00 | Na₂O, 2.00 | SiO₂, 3.50 | 2.00 |
| 160 | Pr₆O₁₁, 3.00 | Na₂O, 2.00 | — | 2.00 |
| 161 | Eu₂O₃, 0.01 | NaF, 0.04 | Ag₂O, 0.01 | 0.02 |
| 162 | Eu₂O₃, 1.00 | NaF, 0.04 | CuO, 0.50 | 0.02 |
| 163 | Eu₂O₃, 3.00 | NaF, 0.04 | MnO₂, 1.00 | 0.02 |
| 164 | WO₃, 0.50 | Na₂O, 2.50 | SiO₂, 3.00 | 2.50 |
| 165 | WO₃, 1.50 | Na₂O, 2.50 | Ag₂O, 0.50 | 2.50 |
| 166 | WO₃, 2.50 | Na₂O, 2.50 | CuO, 1.00 | 2.50 |
| 167 | CeO₂, 0.50 | Na₂O, 1.50 | MnO₂, 3.00 | 1.50 |
| 168 | CeO₂, 1.50 | Na₂O, 1.50 | SiO₂, 0.01 | 1.50 |
| 169 | CeO₂, 3.00 | Na₂O, 1.50 | Ag₂O, 1.00 | 1.50 |
| 170 | Sm₂O₃, 0.01 | NaF, 2.00 | CuO, 3.00 | 1.00 |
| 171 | Sm₂O₃, 1.00 | NaF, 2.00 | MnO₂, 0.01 | 1.00 |
| 172 | Sm₂O₃, 3.00 | NaF, 2.00 | SiO₂, 0.50 | 1.00 |
| 173 | Dy₂O₃, 0.50 | NaF, 1.00 | Ag₂O, 2.00 | 0.50 |
| 174 | Dy₂O₃, 1.50 | NaF, 1.00 | CuO, 0.01 | 0.50 |
| 175 | Dy₂O₃, 2.50 | NaF, 1.00 | MnO₂, 0.50 | 0.50 |
| 176 | Nd₂O₃, 0.50 | Na₂O, 0.10 | SiO₂, 1.00 | 0.10 |
| 177 | Nd₂O₃, 1.50 | Na₂O, 0.10 | Ag₂O, 3.00 | 0.10 |
| 178 | Nd₂O₃, 3.00 | Na₂O, 0.10 | CuO, 2.00 | 0.10 |
| 179 | Y₂O₃, 0.01 | Na₂O, 2.00 | MnO₂, 2.00 | 2.00 |
| 180 | Y₂O₃, 1.00 | Na₂O, 2.00 | SiO₂, 2.00 | 2.00 |
| 181 | Y₂O₃, 3.00 | Na₂O, 2.00 | Ag₂O, 2.00 | 2.00 |
| 182 | Nb₂O₅, 0.005 | Na₂O, 1.00 | Ag₂O, 1.00 | 1.00 |
| 183 | Ta₂O₅, 3.50 | Na₂O, 1.00 | Ag₂O, 1.00 | 1.00 |
| 184 | La₂O₃, 0.005 | NaF, 1.00 | CuO, 2.00 | 0.50 |
| 185 | Sm₂O₃, 3.50 | NaF, 1.00 | CuO, 2.00 | 0.50 |
| 186 | Dy₂O₃, 0.50 | Na₂O, 3.00 | MnO₂, 0.50 | 3.00 |
| 187 | WO₃, 3.00 | Na₂O, 0.01 | MnO₂, 3.00 | 0.01 |
| 188 | La₂O₃, 0.01 | Na₂O, 0.02 | Ag₂O, 1.00 | 0.02 |
| 189 | La₂O₃, 0.10 | Na₂O, 0.50 | Ag₂O, 1.00 | 0.50 |
| 190 | La₂O₃, 0.50 | Na₂O, 1.00 | Ag₂O, 1.00 | 1.00 |
| 191 | La₂O₃, 2.00 | Na₂O, 2.00 | Ag₂O, 1.00 | 2.00 |
| 192 | La₂O₃, 3.00 | Na₂O, 2.50 | Ag₂O, 1.00 | 2.50 |
| 193 | Nb₂O₅, 0.01 | NaF, 5.00 | SiO₂, 0.50 | 2.50 |
| 194 | Nb₂O₅, 0.10 | NaF, 4.00 | SiO₂, 0.50 | 2.00 |
| 195 | Nb₂O₅, 0.50 | NaF, 2.00 | SiO₂, 0.50 | 1.00 |
| 196 | Nb₂O₅, 2.00 | NaF, 1.00 | SiO₂, 0.50 | 0.50 |
| 197 | Nb₂O₅, 3.00 | NaF, 0.04 | SiO₂, 0.50 | 0.02 |
| 198 | Pr₆O₁₁, 0.01 | NaF, 0.04 | MnO₂, 2.00 | 0.02 |
| 199 | Pr₆O₁₁, 0.10 | NaF, 1.00 | MnO₂, 2.00 | 0.50 |
| 200 | Pr₆O₁₁, 0.50 | NaF, 2.00 | MnO₂, 2.00 | 1.00 |
| 201 | Pr₆O₁₁, 2.00 | NaF, 4.00 | MnO₂, 2.00 | 2.00 |
| 202 | Pr₆O₁₁, 3.00 | NaF, 5.00 | MnO₂, 2.00 | 2.50 |
| 203 | Nb₂O₅, 0.50<br>Ta₂O₅, 0.50 | Na₂O, 1.00 | Ag₂O, 0.50<br>CuO, 0.50 | 1.00 |
| 204 | La₂O₃, 1.00<br>Nb₂O₅, 2.00 | Na₂O, 0.02 | CuO, 0.20<br>MnO₂, 0.30 | 0.02 |
| 205 | Eu₂O₃, 0.20<br>Sm₂O₃, 0.30 | Na₂O, 1.00<br>NaF, 3.00 | MnO₂, 1.00<br>SiO₂, 1.00 | 2.50 |
| 206 | WO₃, 0.30<br>Ta₂O₅, 0.20 | Na₂O, 0.50<br>NaF, 1.00 | Ag₂O, 1.00<br>MnO₂, 2.00 | 1.00 |
| 207 | La₂O₃, 0.005<br>CeO₂, 0.005 | NaF, 1.00 | SiO₂, 0.30<br>CuO, 0.20 | 0.50 |
| 208 | Pr₆O₁₁, 1.00 | NaF, 5.00 | Ag₂O, 0.50<br>SiO₂, 0.50 | 2.50 |
| 209 | Y₂O₃, 0.50<br>Sm₂O₃, 0.50 | Na₂O, 0.50 | Ag₂O, 1.00<br>CuO, 0.50 | 0.50 |
| 210 | Nd₂O₃, 1.00<br>Eu₂O₃, 2.00 | Na₂O, 0.02 | CuO, 1.50<br>MnO₂, 1.50 | 0.02 |
| 211 | Ta₂O₅, 1.00 | NaF, 1.00 | MnO₂, 0.50 | 2.00 |

TABLE 4-continued

| | Ceramic Compositions (Aside from 100 mole parts SrTiO₃) | | | |
|---|---|---|---|---|
| Example | Second ingredient(s) in use and proportion(s), mole part | Starting third ingredient(s) in use and proportion(s), mole part | Fourth ingredient(s) in use and proportion(s), mole part | Third ingredient (Na₂O) after firing, mole part |
| 212 | CeO₂, 1.00<br>WO₃, 2.00<br>La₂O₃, 1.00 | Na₂O, 1.50<br>NaF, 1.00<br>Na₂O, 0.50 | SiO₂, 2.50<br>Ag₂O, 0.20<br>MnO₂, 0.30 | 1.00 |
| 213 | Nb₂O₅, 0.50<br>Ta₂O₅, 0.50 | Na₂O, 1.00 | — | 1.00 |
| 214 | Nb₂O₅, 1.00<br>Ta₂O₅, 1.00<br>WO₃, 1.00 | NaF, 0.04 | Ag₂O, 1.00<br>CuO, 0.50<br>SiO₂, 0.50 | 0.02 |
| 215 | La₂O₃, 0.50<br>CeO₂, 0.50<br>Nd₂O₃, 0.50 | Na₂O, 1.00<br>NaF, 3.00 | Ag₂O, 0.20<br>MnO₂, 0.30<br>CuO, 0.50 | 2.50 |
| 216 | Y₂O₃, 0.20<br>Pr₆O₁₁, 0.50<br>Sm₂O₃, 0.30 | Na₂O, 0.50 | MnO₂, 0.01<br>CuO, 0.01<br>SiO₂, 0.01 | 0.50 |
| 217 | Eu₂O₃, 0.01 | Na₂O, 1.00 | Ag₂O, 0.50<br>CuO, 0.50<br>SiO₂, 0.50 | 1.00 |
| 218 | WO₃, 1.00<br>Nd₂O₃, 0.50<br>Eu₂O₃, 0.50 | Na₂O, 2.00 | Ag₂O, 1.00<br>SiO₂, 2.00 | 2.00 |

The above mixtures of four or more ingredients were processed into ceramic test discs, and these were electroded to provide test varistors, through the same procedure as in Examples 1–88. Measured by essentially the same methods and by the same means as in Examples 1–88, the seven pertinent properties of the test varistors were as represented in Table 5.

Only one alteration in the measuring methods was that surges were applied to the test varistors at five-second intervals by the circuit of FIG. 3 for the measurement of the percent variations ($\Delta V_{1P}$ and $\Delta \alpha_p$) of their varistor voltages and nonlinearity coefficients after the surge application. The five-second surge intervals apply to all the following Examples containing at least one of Ag₂O, CuO, MnO₂, and SiO₂ as the fourth ingredient.

TABLE 5

| | Varistor Properties | | | | | | |
|---|---|---|---|---|---|---|---|
| Example | $V_1$, V | $\alpha$ | $\Delta V_1$, %/°C. | C, nF | $\Delta V_{1P}$, % | $\Delta \alpha_P$, % | $\Delta V_{1T}$, %/°C. |
| 137 | 22.5 | 26.9 | −0.04 | 151 | −0.4 | −0.5 | −0.04 |
| 138 | 25.9 | 34.5 | −0.03 | 150 | −0.5 | −0.6 | −0.03 |
| 139 | 20.2 | 38.7 | −0.03 | 150 | −0.7 | −0.7 | −0.03 |
| 140 | 29.7 | 32.6 | −0.04 | 145 | −1.0 | −1.0 | −0.04 |
| 141 | 19.9 | 31.1 | −0.04 | 153 | −9.7 | −8.9 | −0.04 |
| 142 | 21.1 | 20.7 | −0.04 | 148 | −0.4 | −0.4 | −0.04 |
| 143 | 14.6 | 24.0 | −0.04 | 149 | −0.5 | −0.5 | −0.04 |
| 144 | 17.9 | 29.8 | −0.04 | 166 | −0.6 | −0.6 | −0.04 |
| 145 | 15.2 | 33.4 | −0.04 | 163 | −0.8 | −0.9 | −0.04 |
| 146 | 16.6 | 33.9 | −0.04 | 142 | −1.0 | −1.0 | −0.04 |
| 147 | 14.8 | 30.2 | −0.04 | 125 | −7.5 | −10.1 | −0.04 |
| 148 | 16.1 | 18.0 | −0.04 | 144 | −0.7 | −0.7 | −0.04 |
| 149 | 25.2 | 33.1 | −0.03 | 137 | −0.7 | −0.8 | −0.03 |
| 150 | 25.4 | 40.4 | −0.03 | 152 | −0.8 | −0.8 | −0.03 |
| 151 | 29.3 | 44.7 | −0.03 | 143 | −0.9 | −0.9 | −0.03 |
| 152 | 25.4 | 43.5 | −0.03 | 126 | −1.0 | −1.0 | −0.03 |
| 153 | 22.6 | 37.0 | −0.03 | 120 | −13.1 | −15.1 | −0.03 |
| 154 | 20.0 | 17.5 | −0.04 | 106 | −0.9 | −0.8 | −0.04 |
| 155 | 42.5 | 25.6 | −0.04 | 90 | −0.7 | −0.7 | −0.04 |
| 156 | 41.1 | 30.1 | −0.04 | 84 | −0.6 | −0.6 | −0.04 |
| 157 | 39.9 | 35.1 | −0.04 | 75 | −0.7 | −0.8 | −0.04 |
| 158 | 43.1 | 35.0 | −0.04 | 70 | −0.9 | −1.0 | −0.04 |
| 159 | Not coherently bonded on firing. | | | | | | |
| 160 | 38.5 | 19.3 | −0.04 | 93 | −1.0 | −0.9 | −0.04 |
| 161 | 12.8 | 25.7 | −0.05 | 145 | −0.9 | −1.0 | −0.05 |
| 162 | 13.0 | 33.0 | −0.04 | 155 | −0.8 | −0.8 | −0.04 |
| 163 | 13.6 | 37.8 | −0.04 | 139 | −1.0 | −0.9 | −0.04 |
| 164 | 27.1 | 29.0 | −0.04 | 95 | −0.4 | −0.6 | −0.04 |
| 165 | 26.3 | 32.6 | −0.04 | 130 | −0.5 | −0.6 | −0.04 |
| 166 | 27.4 | 29.1 | −0.05 | 149 | −0.7 | −0.6 | −0.05 |
| 167 | 38.1 | 34.7 | −0.04 | 158 | −0.7 | −0.8 | −0.04 |
| 168 | 39.7 | 26.3 | −0.04 | 142 | −0.5 | −0.6 | −0.04 |
| 169 | 39.4 | 28.4 | −0.04 | 135 | −0.8 | −0.6 | −0.04 |
| 170 | 20.6 | 31.2 | −0.04 | 139 | −0.7 | −0.8 | −0.04 |
| 171 | 22.2 | 37.8 | −0.05 | 123 | −0.4 | −0.5 | −0.05 |
| 172 | 19.0 | 37.7 | −0.04 | 91 | −0.8 | −0.7 | −0.04 |
| 173 | 10.4 | 36.4 | −0.03 | 148 | −0.4 | −0.5 | −0.03 |
| 174 | 9.3 | 27.5 | −0.04 | 134 | −0.7 | −0.7 | −0.04 |

TABLE 5-continued

| Example | $V_1$, V | $\alpha$ | $\Delta V_1$, %/°C. | C, nF | $\Delta V_{1P}$, % | $\Delta \alpha_P$, % | $\Delta V_{1T}$, %/°C. |
|---|---|---|---|---|---|---|---|
| 175 | 12.0 | 24.6 | −0.05 | 160 | −0.7 | −0.7 | −0.05 |
| 176 | 11.7 | 26.3 | −0.03 | 121 | −0.8 | −0.8 | −0.03 |
| 177 | 10.6 | 29.2 | −0.04 | 154 | −0.9 | −0.8 | −0.04 |
| 178 | 9.6 | 24.2 | −0.05 | 147 | −1.0 | −1.0 | −0.05 |
| 179 | 33.8 | 39.3 | −0.05 | 135 | −0.8 | −0.7 | −0.05 |
| 180 | 32.4 | 32.7 | −0.04 | 100 | −0.8 | −0.8 | −0.04 |
| 181 | 30.2 | 30.1 | −0.04 | 136 | −0.9 | −1.0 | −0.04 |
| 182 | 23.5 | 13.2 | −0.15 | 94 | −7.5 | −9.2 | −0.18 |
| 183 | 18.6 | 12.4 | −0.18 | 89 | −12.3 | −10.5 | −0.24 |
| 184 | 24.7 | 12.0 | −0.20 | 90. | −13.6 | −15.2 | −0.25 |
| 185 | Not coherently bonded on firing. | | | | | | |
| 186 | 11.3 | 10.9 | −0.16 | 110 | −10.3 | −12.1 | −0.22 |
| 187 | 26.8 | 13.6 | −0.20 | 107 | −22.5 | −30.1 | −0.35 |
| 188 | 36.4 | 34.2 | −0.05 | 120 | −0.9 | −1.0 | −0.05 |
| 189 | 30.7 | 37.2 | −0.04 | 149 | −0.8 | −0.9 | −0.04 |
| 190 | 33.2 | 38.3 | −0.04 | 138 | −0.6 | −0.6 | −0.04 |
| 191 | 34.7 | 35.1 | −0.04 | 133 | −0.6 | −0.5 | −0.04 |
| 192 | 31.2 | 32.8 | −0.05 | 117 | −1.0 | −1.0 | −0.05 |
| 193 | 17.8 | 29.3 | −0.05 | 116 | −1.0 | −1.0 | −0.05 |
| 194 | 17.7 | 32.6 | −0.04 | 130 | −0.8 | −0.9 | −0.04 |
| 195 | 16.4 | 36.0 | −0.03 | 153 | −0.5 | −0.6 | −0.03 |
| 196 | 17.5 | 32.5 | −0.04 | 144 | −0.7 | −0.6 | −0.04 |
| 197 | 14.6 | 28.7 | −0.04 | 101 | −0.9 | −1.0 | −0.04 |
| 198 | 22.6 | 32.4 | −0.05 | 128 | −1.0 | −1.0 | −0.05 |
| 199 | 20.1 | 37.9 | −0.03 | 141 | −0.9 | −0.8 | −0.03 |
| 200 | 24.8 | 41.1 | −0.04 | 157 | −0.7 | −0.6 | −0.04 |
| 201 | 23.2 | 40.2 | −0.04 | 130 | −0.8 | −0.9 | −0.04 |
| 202 | 20.1 | 34.7 | −0.04 | 120 | −1.0 | −0.9 | −0.04 |
| 203 | 14.1 | 35.1 | −0.04 | 166 | −0.4 | −0.4 | −0.04 |
| 204 | 15.1 | 35.4 | −0.05 | 150 | −0.7 | −0.8 | −0.05 |
| 205 | 15.0 | 30.9 | −0.04 | 114 | −0.8 | −0.9 | −0.04 |
| 206 | 38.4 | 35.9 | −0.04 | 122 | −0.9 | −0.9 | −0.04 |
| 207 | 37.7 | 30.9 | −0.05 | 120 | −0.7 | −0.8 | −0.05 |
| 208 | 36.0 | 39.8 | −0.05 | 124 | −0.8 | −0.8 | −0.05 |
| 209 | 21.8 | 40.2 | −0.03 | 153 | −0.6 | −0.5 | −0.03 |
| 210 | 22.1 | 31.1 | −0.05 | 130 | −1.0 | −1.0 | −0.05 |
| 211 | 22.6 | 32.4 | −0.04 | 107 | −0.6 | −0.7 | −0.04 |
| 212 | 12.0 | 28.7 | −0.05 | 146 | −0.8 | −0.9 | −0.05 |
| 213 | 13.9 | 20.6 | −0.04 | 158 | −0.5 | −0.6 | −0.04 |
| 214 | 14.7 | 26.6 | −0.05 | 126 | −0.9 | −1.0 | −0.05 |
| 215 | 32.7 | 34.6 | −0.03 | 138 | −0.8 | −0.8 | −0.03 |
| 216 | 33.3 | 32.6 | −0.04 | 114 | −0.5 | −0.6 | −0.04 |
| 217 | 34.7 | 31.1 | −0.05 | 100 | −0.6 | −0.7 | −0.05 |
| 218 | 31.2 | 35.2 | −0.05 | 92 | −1.0 | −1.0 | −0.05 |

It has been mentioned in connection with Examples 1-88 that the ceramic materials of this invention comprises 100 parts of the first ingredient (SrTiO$_3$), from about 0.01 to about 3.00 parts of at least one second ingredient (metal oxide), and from about 0.02 to about 2.50 parts of the third ingredient (Na$_2$O). According to another aspect of the invention, from about 0.01 to about 3.00 parts of at least one fourth ingredient (Ag$_2$O, CuO, MnO$_2$ or SiO$_2$) is added to the above mixtures.

As will be understood from Tables 4 and 5, highly surge-proof varistors could be obtained by use of the ceramic materials of the above specified compositions in accordance with the additional aspect of the invention. The absolute values of the percent variations ($\Delta V_{1P}$) of their varistor voltages after surge application are not more than 1.0. The absolute values of the percent variations ($\Delta \alpha_P$) of their nonlinearity coefficients after surge application are also not more than 1.0. The absolute values of the temperature dependences ($\Delta V_{1T}$) of their varistor voltages after surge application are not more than 0.05 (%/°C.).

Also favorable are the other tested properties of the varistors containing the fourth ingredient or ingredients in the prescribed range of proportions. The nonlinearity coefficients ($\alpha$) of all such varistors range from 20 to 45, much better than those of 15 to 25 exhibited by the varistors not containing the fourth ingredient. Their varistor voltages ($V_1$) range from 9.3 to 43.1 volts, making them suitable for use in the circuits of electronic instruments with a voltage rating of 5-36 volts. The absolute values of the temperature dependences ($\Delta V_1$) of their varistor voltages are not more than 0.05 (%/°C.). Their capacitances (c) are not less than 70 nanofarads (apparent relative permittivity not less than 1.26 × 10$^5$).

It will be observed from the ceramic compositions and varistor properties given in Tables 4 and 5 that the ceramic compositions containing from 0.01 to 3.00 parts of the fourth ingredient or ingredients improve the nonlinearity coefficients of the resulting varistors. Ceramic compositions containing less than about 0.01 part of the fourth ingredient or ingredients would not improve the nonlinearity coefficients of the varistors. If the proportion of the fourth ingredient or ingredients exceeded about 3.00 parts, on the other hand, then the pertinent properties of the resulting varistors would materially deteriorate after surge application. In the use of SiO$_2$ as the fourth ingredient, in particular, the paste moldings containing more than 3.00 parts of the ingredient were not coherently bonded on firing, as in Example 159. Thus the range of proportions of the fourth ingredient or ingredients is set to be from about 0.01 to about 3.00 parts.

Used in proportions ranging from about 0.01 to about 3.00 parts, at least one second ingredient selected from the above recited group of metal oxides serves to make the ceramic material semiconductive to a desired degree. Consider Examples 182 and 184 in Table 5, containing only 0.005 part of $Nb_2O_5$ and $La_2O_3$, respectively, as the second ingredient. The ceramic materials of these Examples are not sufficiently semiconductive, so that the nonlinearity coefficients ($\alpha$) of the resulting varistors are too small. Also the absolute values of the temperature dependences ($\Delta V_1$ and $\Delta V_{1T}$) of their varistor voltages before and after surge application, and of the percent variations ($\Delta V_{1P}$) of the varistor voltages after surge application, are all unduly high. Examples 183 and 185, on the other hand, contain as much as 3.50 parts of $Ta_2O_5$ and $Sm_2O_3$, respectively, as the second ingredient. The test varistors of Example 183 have poor properties, whereas the paste moldings of Example 185 were not coherently bonded on firing.

The range of proportions of the second ingredient or ingredients is therefore set to be from about 0.01 to about 3.00 parts.

Examples 186 and 187 contain 3.00 and 0.01 part, respectively, of $Na_2O$, the third ingredient. The percent variations ($\Delta V_{1P}$ and $\Delta \alpha_P$) of the varistor voltages and nonlinearity coefficients of these varistors after surge application are far more than one in absolute values. The temperature dependences ($\Delta V_{1T}$) of their varistor voltages after surge application are also much more than 0.05 (%/°C.) in absolute values. Thus the proportion of $Na_2O$ should be in the range from about 0.02 to about 2.50 parts.

It will have been seen from the foregoing that in Tables 4 and 5, Examples 141, 142, 147, 148, 153, 154, 159, 160, 182–186 and 213 fall outside the purview of the present invention.

Examples 203–218 contain two or more second ingredients, two or more third ingredients as starting substances, and/or two or more fourth ingredients, in addition to $SrTiO_3$ as the first ingredient, as in Table 4. Table 5 indicates that the properties of the varistors of such compositions are just as favorable as those of the varistors consisting of only one each of the first, second, third and fourth ingredients.

EXAMPLES 219–238

The same ceramic compositions as those of Examples 138, 145, 152 and 155 were processed into test varistors through the same procedure as in Examples 1–88 except the oxidative heat treatment of the molded discs. In such treatment the discs of each composition were subjected to five different temperatures ($T_H$) of 900°, 1000°, 1100°, 1200° and 1300° C., for two hours at each temperature, in order to determine the relations between the temperatures and the properties of the resulting varistors. Table 6 represents the results. The properties were measured by the same methods and by the same means as in Examples 1–88 except the five-second intervals of surge application for the measurement of the consequent percent variations of the varistor voltages and nonlinearity coefficients.

TABLE 6

| | Ceramic Compositions & Varistor Properties | | | | | | | | |
|---|---|---|---|---|---|---|---|---|---|
| Example | Composition Same as: | $T_H$, °C. | $V_1$, V | $\alpha$ | $\Delta V_1$, %/°C. | C, nF | $\Delta V_{1P}$ % | $\Delta \alpha_P$ % | $\Delta V_{1T}$, %/°C. |
| 219 | Example 138 | 900 | 4.1 | 16.3 | −0.05 | 234 | −1.0 | −1.0 | −0.05 |
| 220 | Example 138 | 1000 | 8.2 | 26.0 | −0.04 | 191 | −0.9 | −0.8 | −0.04 |
| 221 | Example 138 | 1100 | 17.0 | 33.4 | −0.03 | 164 | −0.5 | −0.7 | −0.03 |
| 222 | Example 138 | 1200 | 32.4 | 34.1 | −0.03 | 130 | −0.4 | −0.4 | −0.03 |
| 223 | Example 138 | 1300 | 89.7 | 33.8 | −0.03 | 114 | −0.4 | −0.4 | −0.03 |
| 224 | Example 145 | 900 | 5.0 | 17.6 | −0.05 | 191 | −1.0 | −1.0 | −0.05 |
| 225 | Example 145 | 1000 | 15.8 | 33.7 | −0.04 | 163 | −0.8 | −0.9 | −0.04 |
| 226 | Example 145 | 1100 | 31.1 | 37.6 | −0.04 | 127 | −0.7 | −0.8 | −0.04 |
| 227 | Example 145 | 1200 | 60.6 | 38.8 | −0.04 | 100 | −0.7 | −0.8 | −0.04 |
| 228 | Example 145 | 1300 | 132.0 | 38.4 | −0.04 | 88 | −0.6 | −0.6 | −0.04 |
| 229 | Example 152 | 900 | 5.3 | 15.3 | −0.05 | 162 | −1.0 | −1.0 | −0.05 |
| 230 | Example 152 | 1000 | 25.4 | 43.5 | −0.03 | 126 | −1.0 | −1.0 | −0.03 |
| 231 | Example 152 | 1100 | 59.1 | 47.5 | −0.03 | 116 | −0.6 | −0.6 | −0.03 |
| 232 | Example 152 | 1200 | 116.7 | 45.5 | −0.03 | 101 | −0.6 | −0.7 | −0.03 |
| 233 | Example 152 | 1300 | 227.7 | 43.9 | −0.03 | 96 | −0.4 | −0.4 | −0.03 |
| 234 | Example 155 | 900 | 9.6 | 18.7 | −0.04 | 165 | −0.9 | −0.9 | −0.04 |
| 235 | Example 155 | 1000 | 19.7 | 20.9 | −0.04 | 130 | −0.8 | −0.9 | −0.04 |
| 236 | Example 155 | 1100 | 31.4 | 26.0 | −0.04 | 113 | −0.8 | −0.8 | −0.04 |
| 237 | Example 155 | 1200 | 53.2 | 28.2 | −0.04 | 84 | −0.7 | −0.7 | −0.04 |
| 238 | Example 155 | 1300 | 92.0 | 35.3 | −0.03 | 67 | −0.7 | −0.6 | −0.04 |

Table 6 indicates that the varistor voltages ($V_1$) of each group of test varistors become progressively greater with the higher temperatures of the oxidative heat treatment even though the varistors are of the same size and composition. Consequently, even those ceramic materials which contain the fourth ingredients in accordance with the invention can be processed into varistors of the same size and composition but of different properties merely by changing the temperature of the oxidative heat treatment. A preferred temperature range of the oxidative heat treatment for the provision of surge-proof varistors is, in the present case, from about 900° to about 1300° C.

EXAMPLE 239

In this and all the subsequent Examples it was intended to ascertain if the third ingredient, $Na_2O$, can be added to ceramic bodies after their firing, rather than being used as one of the starting substances, for the provision of varistors meeting the requirements of this invention.

Semiconductive ceramic test discs were fabricated by use of 100 parts of $SrTiO_3$ (first ingredient) and 0.10 part of $CeO_2$ (second ingredient) through the procedure of Examples 1–88 up to the firing of the discs. Then, instead of the thermal oxidation of the discs, pasted NaF was coated on one of the opposite faces of each disc at a rate of 0.77 milligram per square centimeter. The coated discs were heated, in air, in a temperature range from 900° to 1100° C., for two hours. This heat treatment caused diffusion of $Na_2O$, converted from the NaF paste, into the discs. Then the discs were electroded into varistors by the same method as in Examples 1-88.

Measured by the same means and the same methods as in Examples 1-88, the varistor voltages ($V_1$) of the above fabricated test varistors averaged 18.9 volts; their nonlinearity coefficients ($\alpha$) 15.5; the temperature dependences ($\Delta V_1$) of their varistor voltages $-0.04$ %/°C.; their capacitances (C) 164 nanofarads; the percent variations ($\Delta V_{1P}$) of their varistor voltages after surge application $-0.6$ percent; the percent variations ($\Delta \alpha_P$) of their nonlinearity coefficients after surge application $-0.6$ percent; and the temperature dependences ($\Delta V_{1T}$) of their varistor voltages after surge application $-0.04$ %/°C.

EXAMPLE 240

Ceramic test discs were fabricated by use of 100 parts of $SrTiO_3$ (first ingredient) and 0.5 part of $Nb_2O_5$ (second ingredient) through the procedure of Examples 1-88 up to the firing of the discs. Then, instead of the oxidative heat treatment, pasted $Na_2O$ was coated on one of the opposite faces of each test disc at a rate of 1.54 milligrams per square centimeter. The coated test discs were heated as in Example 239 to cause diffusion of $Na_2O$ into the discs. Then the test discs were electroded into varistors by the same method as in Examples 1-88.

Measured by the same means and the same methods as in Examples 1-88, the $V_1$ of the test varistors averaged 16 volts; their $\alpha$ 19.6; their $\Delta V_1$ $-0.03$ %/°C.; their C 154 nanofarads; their $\alpha V_{1P}$ $-0.5$ percent; their $\Delta \alpha_P$ $-0.5$ percent; and their $\alpha V_{1T}$ $-0.03$ %/°C.

EXAMPLE 241

Ceramic test discs were fabricated by use of 100 parts of $SrTiO_3$ (first ingredient) and 1.0 part of $WO_3$ (second ingredient) through the procedure of Examples 1-88 up to the firing of the discs. Then, instead of the oxidative heat treatment, pasted NaCl was coated on one of the opposite faces of each test disc at a rate of 6.16 milligrams per square centimeter. The coated discs were heated as in Example 239 to cause diffusion of $Na_2O$, converted from the NaCl paste, into the discs. Then the test discs were electroded into varistors by the same method as in Examples 1-88.

Measured by the same means and the same methods as in Examples 1-88, the $V_1$ of the test varistors averaged 23.7 volts; their $\alpha$ 18.6; their $\Delta V_1$ $-0.04$ %/°C.; their C 139 nanofarads; their $\Delta V_{1P}$ $-0.7$ percent; their $\Delta \alpha_P$ $-0.7$ percent; and their $\Delta V_{1T}$ $-0.04$ %/°C.

EXAMPLE 242

Ceramic test discs were fabricated by use of 100 parts of $SrTiO_3$ (first ingredient), 0.5 part of $Nb_2O_5$ (second ingredient), and 2.0 parts of $SiO_2$ (fourth ingredient) through the procedure of Examples 1-88 up to the firing of the discs. Then, instead of the oxidative heat treatment, pasted NaF was coated on one of the opposite faces of each test disc at a rate of 0.93 milligram per square centimeter. The coated test discs were heated as in Example 239 to cause diffusion of $Na_2O$, converted from the NaF paste, into the discs. Then the test discs were electroded into varistors by the same method as in Examples 1-88.

Measured by the same means and by substantially the same methods as in Examples 1-88, the $V_1$ of the test varistors averaged 23.4 volts; their $\alpha$ 34.5; their $\Delta V_1$ $-0.03$ %/°C.; their C 120 nanofarads; their $\Delta V_{1P}$ $-0.4$ percent; their $\Delta \alpha_P$ $-0.3$ percent; and their $\Delta V_{1T}$ $-0.02$ %/°C.

EXAMPLE 243

Ceramic test discs were fabricated by use of 100 parts of $SrTiO_3$ (first ingredient), 0.01 part of $La_2O_3$ (second ingredient), and 0.50 part of $MnO_2$ (fourth ingredient) through the procedure of Examples 1-88 up to the firing of the discs. Then, instead of the oxidative heat treatment, pasted $Na_2O$ was coated on one of the opposite faces of each test disc at a rate of 1.20 milligrams per square centimeter. The coated test discs were heated as in Example 239 to cause diffusion of $Na_2O$ into the discs. Then the test discs were electroded into varistors by the same method as in Examples 1-88.

Measured by the same means and by substantially the same methods as in Examples 1-88, the $V_1$ of the test varistors averaged 16.3 volts; their $\alpha$ 35.4; their $\Delta V_1$ $-0.04$ %/°C.; their C 167 nanofarads; their $\Delta V_{1P}$ $-0.6$ percent; their $\Delta \alpha_P$ 31 0.6 percent; and their $\Delta V_{1T}$ $-0.04$ %/°C.

EXAMPLE 244

Ceramic test discs were fabricated by use of 100 parts of $SrTio_3$ (first ingredient), 1.0 part of $Pr_6O_{11}$ (second ingredient), and 3.0 parts of $Ag_2O$ (fourth ingredient) through the procedure of Examples 1-88 up to the firing of the discs. Then, instead of the oxidative heat treatment, pasted NaF was coated on the test discs at a rate of 2.00 milligrams per square centimeter. The coated test discs were heated as in Example 239 to cause diffusion of $Na_2O$, converted from the NaF paste, into the discs. Then the test discs were electroded into varistors by the same method as in Examples 1-88.

Measured by the same means and by substantially the same methods as in Examples 1-88, the $V_1$ of the test varistors averaged 42.1 volts; their $\alpha$ 32.7; their $\Delta V_1$ $-0.04$ %/°C.; their C 140 nanofarads; their $\alpha V_{1P}$ $-0.9$ percent; their $\Delta \alpha_P$ $-0.9$ percent; and their $\Delta V_{1T}$ $-0.04$ %/°C.

The foregoing Examples 239-244 prove that $Na_2O$ or any of the other listed sodium compounds need not be one of the starting substances of the ceramic materials in accordance with the invention. The subsequent introduction of $Na_2O$ by thermal diffusion also makes possible the provision of surge-proof varistors.

Additional experiments by the inventors have revealed the following findings:

1. In firing moldings of the inventive compositions in a reductive atmosphere for the fabrication of ceramic bodies, the temperature can be in the range from 1300° to 1500° C., preferably from 1350° to 1450° C. The period of such firing can be from two to eight hours.

2. The subsequent oxidative heat treatment can be effected in the temperature range from 850° to 1350° C., for one to five hours.

3. The invention requires that at least one of the listed metal oxides be contained in completed ceramic materials as the second ingredient. Thus the initial mixtures to be processed into ceramic bodies may contain, instead of the metal oxides themselves, other substances such as metallic elements, carbonates, hydroxides, nitrates, or oxalates which will become the desired metal oxides on firing.

4. The amount of an organic binder can be from five to 20, preferably from 10 to 15, percent by weight of the mixtures of the first to fourth ceramic ingredients.

We claim:

1. A ceramic material with a voltage-dependent non-linear resistance, comprising 100 mole parts of $SrTiO_3$, from about 0.01 to about 3.00 mole parts of at least one metal oxide selected from the group consisting of $Nb_2O_5$, $Ta_2O_5$, $WO_3$, $La_2O_3$, $CeO_2$, $Nd_2O_3$, $Y_2O_3$, $Sm_2O_3$, $Pr_6O_{11}$, $Eu_2O_3$, and $Dy_2O_3$, and from about 0.02 to about 2.50 mole parts of $Na_2O$.

2. A ceramic material as claimed in claim 1, further comprising from about 0.01 to about 3.00 mole parts of at least one oxide selected from the group consisting of $Ag_2O$, $CuO$, $MnO_2$, and $SiO_2$.

* * * * *